Patented Nov. 21, 1922.

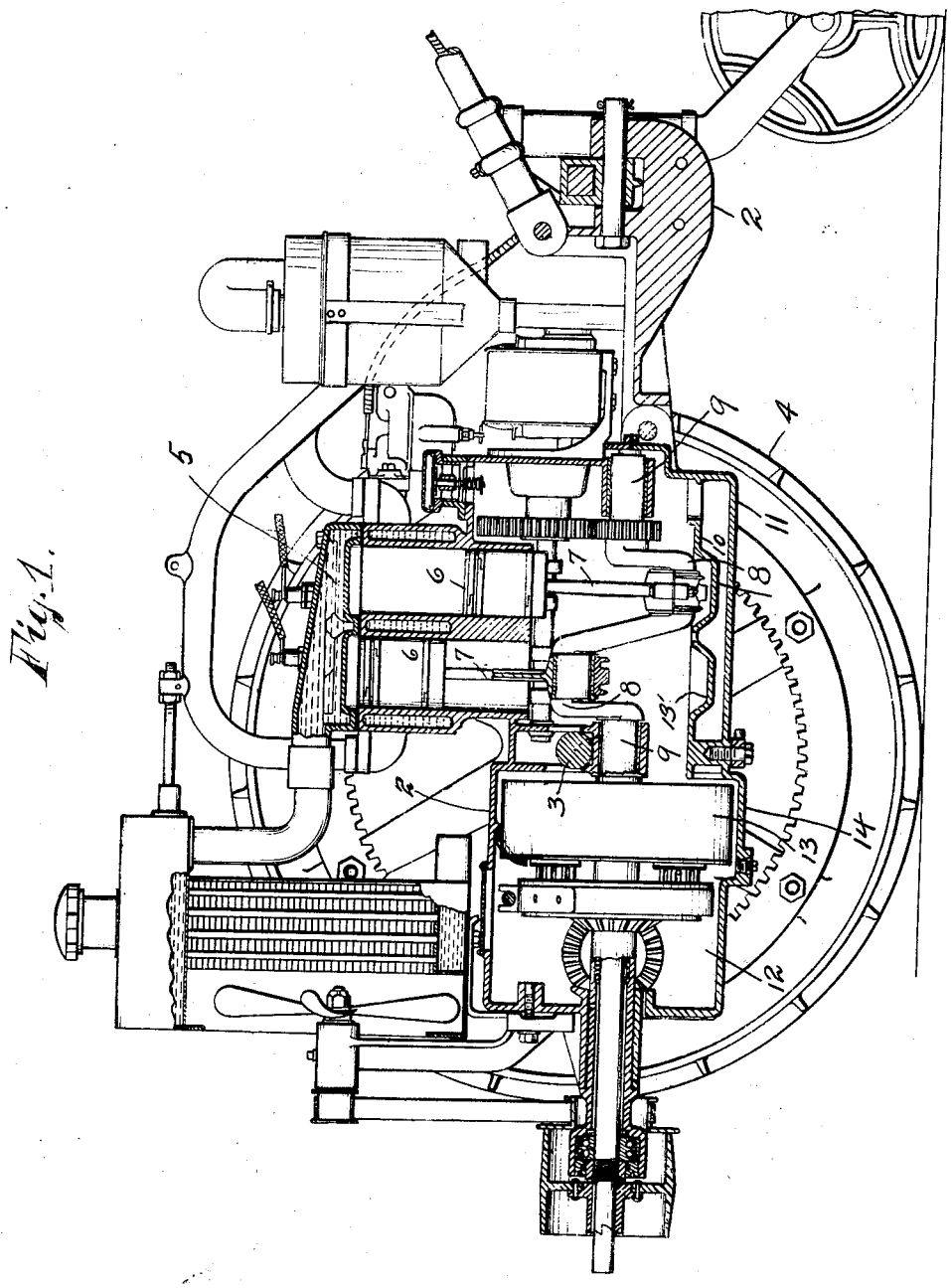

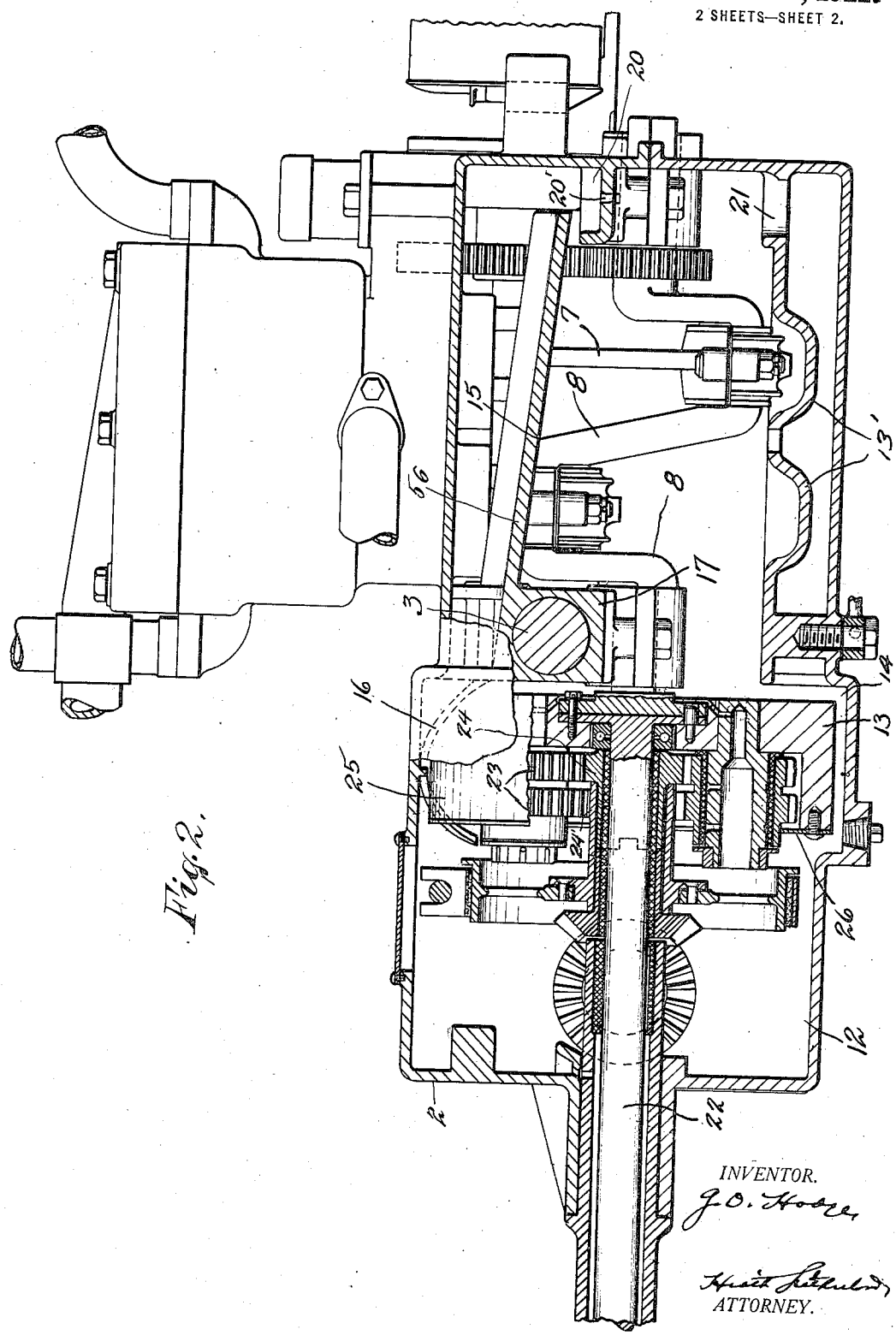

1,436,442

UNITED STATES PATENT OFFICE.

GEORGE O. HODGE, OF BRISTOL, CONNECTICUT, ASSIGNOR TO THE NEW BRITAIN MACHINE COMPANY, OF NEW BRITAIN, CONNECTICUT, A CORPORATION OF CONNECTICUT.

TRACTOR.

Application filed February 9, 1920. Serial No. 357,256.

*To all whom it may concern:*

Be it known that GEORGE O. HODGE, a citizen of the United States, residing at Bristol, in the county of Hartford and State of Connecticut, has invented certain new and useful Improvements in Tractors, of which the following is a specification.

This invention relates to lubricating apparatus. While lubricating apparatus involving my invention is capable of general use, it is of particular advantage when incorporated in a tractor or equivalent appliance. Among the objects of the invention are the provision of effective means by which the action of a device can be properly insured through adequate lubrication and by which when required the lubricant can be properly conducted and directed to parts which require it.

In the drawings accompanying and forming part of the present specification I have shown in detail a form of embodiment of the invention which to enable those skilled in the art to practice the same will be set forth fully in the following description. I am in no sense restricted to this disclosure. I may depart therefrom in a number of respects within the scope of the invention defined by the claims following said description.

Referring to said drawings:

Figure 1 is a longitudinal central section of a tractor equipped with lubricating means involving the invention.

Fig. 2 is a sectional side elevation of the tractor showing also the said lubricating means.

Like characters refer to like parts in the respective views.

As I have already in effect intimated the lubricating means is capable of success in many different fields although it has demonstrated its many advantages when associated with a tractor such as that shown and which will be briefly described. The tractor comprises a framework or body 2 which is usually of hollow construction. The axle is denoted by 3 and is furnished with traction wheels 4, the axle extending through the frame or body 2. The engine by which power is applied to the tractor is denoted by 5 and its cylinders enclose pistons as 6 connected as by rods 7 with cranks 8 on the crank shaft 9 which turn in the crank dip plate 10 which is connected in some convenient way to the removable bottom 11 of the main frame or body 2. In the compartment 12 back of the crank casing, the crank shaft 9 has fastened thereto a fly wheel as 13 serving its usual function.

In the removable cover 11 is what is known as a sump, depression or pocket 14, and in this sump or depression 14 the fly wheel 13 rotates, thus lifting oil therefrom carrying it around and discharging it into the entering end of the trough 15 inclined downwardly and rearwardly, the oil being thrown off centrifugally by the fly wheel or drum 13 and onto the diverter 16 practically in the form of a plate set over the forward upper side of the fly wheel 13. The oil is directed against the under surface of this diverter or curved plate 16 and is directed thereby into the upper or high end of the trough 15 which is inclined rearwardly and downwardly. The trough has on its under side the block 17 through which the shaft or axle 3 passes. The oil flows down this trough and its delivery end or lip is situated above a receiver 20 united in some suitable way to the rearward part of the housing 2 immediately above the back end of the crank shaft 9. This receiver 20 is in the form of a pocket or apertured flange generally made in one piece with the body of the housing or frame 2, and receives the oil from the trough 15 passing through it and flowing over it where it enters the trough into the pocket or depression 14 of the plate 12. The under side of the receiver 20 has an opening 20' to permit the necessary oil or equivalent lubricant to pass to the rear end of the crank shaft 9 by way of the rear bearing of said crank shaft through which said rear bearing said opening 20' extends the oil beyond this, flowing as I have already intimated over the receiver and onto the cover plate 12 where it enters the dips or pockets 13'. Into these dips or pockets the journals connecting the cranks of the shaft 9 with the rods 7 dip, in view of which circumstance such journals are adequately and properly lubricated. Oil also passes through the hole 21 at the back end of the dip plate 13 and naturally reaches the bottom 11 of the frame, body or housing 2. The parts of the engine therefore to which I have referred receive sufficient lubrication to insure proper action. Not only is this so but the moving parts carried by the fly wheel 13 are efficiently and adequately lubricated.

The fly wheel 13 is fastened to the extension 22 (Fig. 2). With it is associated means by which the necessary power of the engine is transferred to the main shaft or axle 3 and subsequently to the wheels 4, for propelling the vehicle. The fly wheel 13 is shown as being practically hollow, its rear wall carrying two pinions 23 which mesh with pinions 24.

It will be understood that oil or equivalent lubricant after having struck the diverter 16 is partly directed into the trough 15 and also down the rear face of the drum or fly wheel 13. This oil enters the fly wheel and thoroughly and completely lubricates the gears therein. Forward of the diverter 16 is a secondary diverter 25 which like the other one is arched, the arch being forwardly and downwardly. Oil is directed centrifugally against its lower surface and is in turn entered by it into the hollow fly wheel or drum 13 the oil being retained therein to insure complete lubrication of the toothed peripheries of the several pinions within the drum or fly wheel. Against the forward open face of the fly wheel or drum is a ring 26 which can be held in place to the drum for instance by screws thus making a pocket or channel in the drum in which oil is retained to an extent sufficient that the pinions as they revolve can take it up on their surfaces or peripheries so that the gears are not only lubricated internally and completely but also exteriorly.

What I claim is:

1. Lubricating apparatus comprising a fly wheel, a drum rotative with the fly wheel and open on one side, means involving gears mounted on the fly wheel, for transferring the effect of the fly wheel to mechanism to be driven, the frame having means associated therewith, for receiving oil in which the fly wheel turns, and means for retaining oil in the fly wheel to lubricate the gears carried thereby.

2. Lubricating apparatus comprising a fly wheel open on one side, means involving gears mounted in the fly wheel, for transferring the effect of the fly wheel to mechanism to be driven, the frame having means associated therewith for receiving oil in which the fly wheel turns, means for retaining oil in the fly wheel to lubricate the gears therein, and means for conducting lubricant elevated by the fly wheel to a part to be lubricated.

3. Lubricating apparatus comprising a fly wheel open on one side, means involving gears mounted in the fly wheel for transferring the effect of the fly wheel to mechanism to be driven, the frame having means associated therewith for receiving oil in which the fly wheel turns, and a ring fitted to the open side of the fly wheel and overhanging the same for retaining oil in the fly wheel to lubricate the gears therein.

4. Lubricating apparatus comprising a fly wheel open on one side, means involving gears in the fly wheel for transferring the effect of the fly wheel to mechanism to be driven, the frame having means associated therewith, for receiving oil in which the fly wheel turns, the fly wheel having a hollow stud for supporting certain of the gears, the stud and the fly wheel having means for conveying oil from the exterior of the fly wheel into the hollow stud and also to the gears on the stud.

In testimony whereof I affix my signature in the presence of two witnesses.

GEORGE O. HODGE.

Witnesses:
JOHN BUCKLEY.
HEATH SUTHERLAND.